UNITED STATES PATENT OFFICE 2,642,335

PRODUCTION OF THREE-DIMENSIONAL DENDRITIC SODIUM CHLORIDE CRYSTALS

Winston Ewart May, Rudheath, and Thomas Reginald Scott, Acton Bridge, England, assignors to Imperial Chemical Industries Limited, a corporation of Great Britain No Drawing. Application January 23, 1950, Serial No. 140,143. In Great Britain February 23, 1949

2 Claims. (Cl. 23—89)

This invention relates to a new and improved form of salt (sodium chloride) having certain advantages which are of importance in industrial and export usages, more particularly low bulk density, ready solubility and free-flowing characteristics.

The production of salt having these properties has until now always involved evaporation in conditions such that there is an almost undisturbed air-brine interface on which plate-like or hopper-shaped crystals grow. Attempts to use multiple effect evaporation have always yielded cubic crystals which have a bulk density of about 1. Many laboratory experiments have been carried out to investigate the effect of other substances on the crystallisation of salt from brine, and some have yielded hollow-faced cubes and octahedral crystals, but not a specially light form. Moreover, most of those results have been obtained by crystallising a drop of brine on a microscope slide, and none of them have been confirmed with conditions altered to be suitable for evaporation on an industrial scale.

We have made a new form of salt which has several spiky branches on each crystal, and crystals of this shape occupy a relatively large volume per unit weight. It is essential to have spikes lying in more than one plane if the crystals are to pack voluminously, but apart from this the size and shape of the spike are relatively unimportant. This form of salt is relatively easily distinguished from the known forms in that it has a bulk density not exceeding 0.7 gram per cc. and on microscopic examination (at a magnification of, say 50) it is obviously spiky and unlike the low density plate-like crystals already known.

According to the present invention, therefore, the new and improved form of salt comprises 3-dimensional dendrites having a bulk density not exceeding 0.7 gm. per cc., that is to say dendritic crystals of which the characteristic dendritic arms or spikes lie in three dimensions. Such crystals will thus be understood to have grown with at least three main spiky or needle-shaped arms lying in more than one plane and usually with subsidiary arms growing from the main arms, and to have a bulk density not exceeding 0.7 gm. per cc.

In a preferred form the 3-dimensional dendritic crystals are of at least 0.1 mm. in size, generally of from 0.3 mm. to 1.0 mm. in size. In this preferred form the crystals have a bulk density between 0.5 and 0.6 gm. per cc. The most desirable form of crystal also has the subsidiary arms or spikes extending in more than one plane so that even if a crystal is accidentally broken the portions still retain the 3-dimensional dendritic form and the desired properties. The 3-dimensional dendritic crystals are essentially long irregular branching spiky growths connected at the bases and generally thicker at the base than at the tip. When six or eight branches are roughly of equal lengths, the highly magnified crystals look like part of a star.

The form of salt provided by this invention does not cake in the manner in which cubic crystals of salt cake when standing in air. It readily dissolves in water by percolation, it occupies a large volume per unit weight, and in humid climates it holds comparatively large proportions of brine without dripping. Properties of this nature have hitherto been associated with expensive open pan grades of salt, and the manufacture of the latter grades of salt is a specialised art which has been practised for centuries using open pans heated by fires beneath the pans with the object of producing crystals having an open structure. In the open pan process, the crystals are grown on the surface of the liquor and disturbance of the latter surface is avoided by evaporating the brine slowly. Thus the crystals cannot grow much in the direction perpendicular to the brine surface. Depending on the conditions in which the pan process is conducted and on additives which are dissolved in the brine, crystals varying from thin light flakes to quite thick hollow hopper-shapes are obtained. Additives used have included soap, starch, alum, glue and butter. The production of open pan salt involves the use of much fuel and labour even when modern plant with steam heating and mechanical handling is used. By comparison, the preparation of salt by multiple effect vacuum evaporation is much more efficient in fuel and labour, but it has hitherto only been capable of making compact cubic or octagonal crystals.

According to a further feature of the invention, we provide a process for the manufacture of salt of low bulk density which comprises evaporating brine containing a modifying agent as hereinafter defined, substantially in absence of air and in such a manner that crystallisation mostly takes place in the body of the brine, and with insufficient agitation to disintegrate the crystals so obtained.

By a modifying agent we mean a substance which inhibits crystallisation in the centres of the faces of the crystal, thus causing crystallisation of salt as hollow-faced cubes or octahedra. In extreme cases where the concentration of modifying agent is high or the agent is unusually effective or the rate of crystallisation is high, the crystallisation is not only inhibited at the face-centres but also on the edges, thereby so accentuating the corners as to produce dendrites, which have spikes in three dimensions. They may have up to eight main spikes if unbroken, and these eight main spikes may also have subsidiary branches on each spike, and so on. The modifying agents we use belong to one of three classes of substances. The first class is the known group of substances which have the formula (A[MX$_6$] in which the complex ion MX$_6$ has the X groups disposed around M preferably in the same manner as at the corners of an octahedron), of approximately the size which will fit into the NaCl lattice but preferably of different charge to the unit which it displaces (the displaced unit being generally the Na atom surrounded by six Cl atoms, or vice versa). This group of substances is readily adsorbed by the growing salt crystal. The preferred substances in this group are the iron compounds, particularly K$_3$[Fe(C$_2$O$_4$)$_3$] in which each oxalate group provides two of the X groups, FeK[Fe(CN)$_6$]

Na$_2$[Fe(NO)(CN)$_5$]

K$_4$[Fe(CN)$_6$] and K$_3$[Fe(CN)$_6$]. Other compounds which can be used include

[Co(NO$_3$)(NH$_3$)$_5$](NO$_3$)$_2$

[Co(NH$_3$)$_4$(H$_2$O)Cl]Cl and K[Co(NH$_3$)$_2$(NO$_2$)$_4$] in which different X groups appear in each molecule. The second class of substance used as modifying agents are water-soluble salts of mono- or polycarboxylic acids having not more than 20 carbon atoms. Examples of this class are sodium palmitate, sodium laurate, sodium stearate, sodium gluconate, sodium formate, ammonium salicylate, sodium phthalate, ammonium aleate, potassium malate, sodium fumarate, sodium chloracetate and sodium aminoacetate. The third class of substances are very soluble in water giving solutions containing 35–80% of modifying agent in which salt is generally only 1–2% soluble, and make a very viscous solution. This includes glycerol, ammonium nitrate, caustic soda, calcium chloride, ethylene glycol, mannitol, glucose, fructose, and sucrose.

The amount of modifying agent used depends on the magnitude of the effect required as well as the efficacy of the agent. Between 0.5 p. p. m. and 5 p. p. m. by weight of the complex A(MX$_6$) substance in the initial brine is sufficient to produce hollow-faced cubes or 3-dimensional dendrites at temperatures above 100° C., but we generally prefer to start with a brine containing up to 0.002% depending on the conditions. Larger amounts of the carboxylates are needed, and some of them are not sufficiently soluble in brine to produce 3-dimensional dendrites, though they do produce hollow-faced cubes. In general, between 0.005% and 0.02% by weight of the monocarboxylic acid salts is sufficient, or between 0.5% and 2% by weight of dibasic acid salts. Between 20% and 60% by weight of the third class of substances is required in order to produce the desired effect. The proportion required is readily ascertained by trial in each case.

The evaporation is preferably carried out by boiling at temperatures of 35°–130° C., under suitable absolute pressures. The preferred method of evaporation, particularly with the first two classes of modifying agent, is by multiple effect in order to secure the full benefits of low fuel consumption, but single effect evaporation may also be used with the generation of useful steam. In order to give the crystals an opportunity to grow to a commercially attractive size such as 0.3 mm. or larger, the evaporator, if it is of the usual multiple effect type, should be arranged so that the brine in the evaporation zone contains from 2% to 5% by weight of salt in suspension. The agitation is limited to ensure production of the desired crystal form and to avoid breaking up the crystals. If there is too much agitation, such as is produced by boiling in industrial vacuum evaporators with a rate of steam evolution as high as 4000 cubic metres of steam per square metre cross section of the evaporator body per hour, the product does not look much like 3-dimensional dendrites and has a bulk density of about 0.75 gm. per cc. Reduction of this agitation, however, soon changes the product so that it has a fluffy dendritic appearance and its bulk density falls below 0.70 gm. per cc. The reason for this may well be that disintegration of the dendrites occurs when the agitation is brisk. There is no definable unit of agitation, and in any case the permissible amount varies with the shape and type of apparatus. All that can be stated is that if the crystals obtained are insufficiently dendritic in appearance and of too high a bulk density, a decrease in agitation will produce a substantial improvement. Other types of evaporators can be used including for example forced circulation evaporators, evaporators having separate chambers for heating, evaporating and crystallising with circulation of liquor therethrough, and also pots in which the brine is boiled briskly by heating from below and the steam is withdrawn.

The invention is illustrated but not restricted by the following examples.

*Example 1*

Brine was purified of its calcium and magnesium content, and 10 parts of K$_4$[Fe(CN)$_6$] were added to a million parts of brine by weight. The pH value of the brine was 10. The evaporator used consisted of a calandria for heating the brine, flash vessel, crystallising chamber, and pump to circulate the brine through this system. Vacuum was applied so that boiling occurred in the flash vessel at a temperature of 90° C. The circulation was arranged so that the crystals in the crystallising chamber remained there without being carried out by the up-flow of brine through them. The heating in the calandria was arranged so that the temperature rise of the brine was 4° C. The initial crystals added to the crystallising chamber were small cubes, but growth developed preponderantly at the corners. The accretions at the corners of the original cubes then developed further growths of a branched appearance. The crystals were kept in the suspension chamber for up to 2–3 hours. After this time they were between 0.3 and 1 mm. in length. The bulk density of the dried crystals was 0.45 gm. per cc.

*Example 2*

Brine was purified of its calcium and magnesium content, and 100 parts of potassium palmitate were added to a million parts of brine by weight. The pH value of the brine was 10. The evaporator used consisted of a closed vessel containing the brine and fitted with a steam-heated calandria, and having a steam outlet at the top and a salt outlet at the bottom. Vacuum was applied to the vessel so that the brine boiled at 80° C.

The ebullition caused agitation of the brine in the evaporator, and the salt crystals formed remained suspended in the brine until they grew large enough to fall into the salt outlet at the bottom of the evaporator. These crystals grew preferentially along the edges and produced a low density hollow-faced cube. The crystals fell into the outlet when they approached 0.5 mm. dimension. The dried product had a bulk density of 0.7 gm. per cc.

*Example 3*

Brine was mixed with calcium chloride so that the boiling point of the solution at atmospheric pressure was 130° C. The evaporator used was a corrosion-resistant vessel directly heated by a fire. It had one steam outlet and one brine inlet and was fitted with a stirrer. Brine was added intermittently to the boiling suspension and salt was extracted after each brine addition. In the intervals between the brine additions, the evaporation gradually brought back the boiling point from about 125° C. to 130° C. The salt crystals obtained after steady conditions had been established were in the form of dendrites of a coordinate axis type and had the appearance in some instances where the branches were short of six-pointed 3-dimensional stars. The bulk density of these salt crystals was 0.6 gm. per cc.

What we claim is:

1. Sodium chloride in the form of 3-dimensional dendrites and having a bulk density not exceeding 0.7 gm. per cc.

2. A process for the manufacture of sodium chloride of low bulk density in the form of 3-dimensional dendrites which comprises evaporating substantially in the absence of air, brine containing at least 0.5 p. p. m. by weight of an alkali metal iron cyanide, said evaporation being carried out in a manner to permit crystallization to take place almost entirely in the body of the brine with insufficient agitation to disintegrate the crystals formed.

WINSTON EWART MAY.
THOMAS REGINALD SCOTT.

References Cited in the file of this patent

UNITED STATES PATENTS

| Number | Name | Date |
| --- | --- | --- |
| 1,950,459 | Seifert | Mar. 13, 1949 |

FOREIGN PATENTS

| Number | Country | Date |
| --- | --- | --- |
| 3,015 | Great Britain | Feb. 9, 1884 |
| 1,453 | Great Britain | 1891 |